July 8, 1930.　　　J. J. O. RULIANCICH　　　1,770,016
POWER TRANSMISSION APPARATUS
Filed Nov. 20, 1925
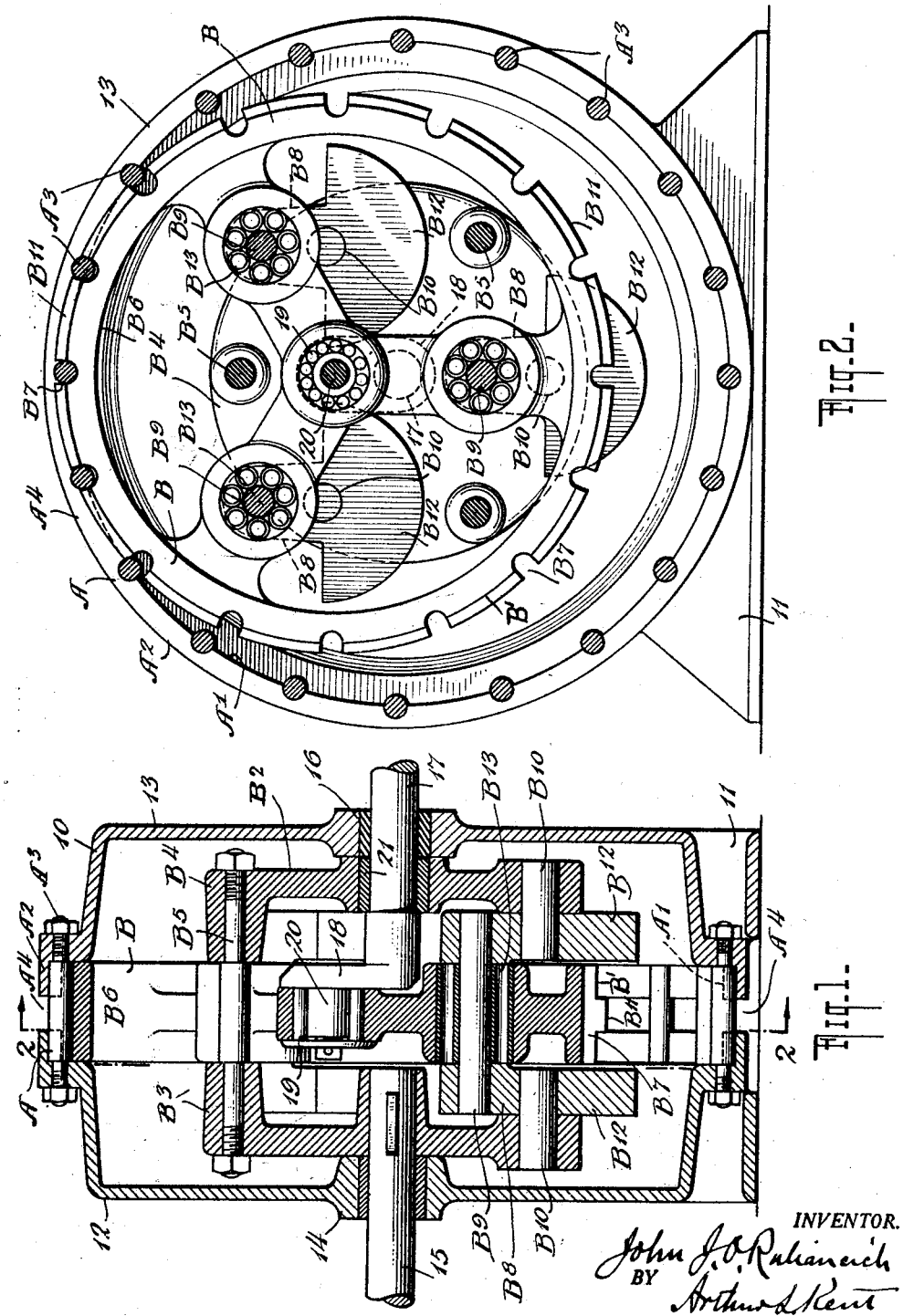
INVENTOR.
John J. O. Ruliancich
BY Arthur L. Kent
his ATTORNEY.

Patented July 8, 1930

1,770,016

UNITED STATES PATENT OFFICE

JOHN J. O. RULIANCICH, OF ARNOLD, PENNSYLVANIA

POWER-TRANSMISSION APPARATUS

Application filed November 20, 1925. Serial No. 70,212.

This invention relates to power transmission apparatus and aims to provide means by which a high reduction of speed with a corresponding increase of torque may be obtained with a minimum loss of power.

The invention relates particularly to transmission apparatus of the type in which an inner gear is given a rotational movement about the axis of an outer gear with which it co-operates, and the object of the invention is to provide a practical transmission apparatus of this character which is simple and rugged in construction, so that it may be manufactured economically and may be used for a high degree of reduction and to apply heavy torques. A particular object of the invention is to provide for a combined positive and frictional engagement of the gears, so that, while positive engaging elements insure an absence of slip at comparatively low speeds, friction surfaces are brought forcibly together and relieve the strain on the positive elements at high speeds when high torques are applied. A further object of the invention is to counterbalance the centrifugal force of the inner gear about the axis of the transmission apparatus, while at the same time leaving this gear free to move outwardly under its centrifugal force so as to bring its friction surface into firm contact with the friction surface of the outer gear. A still further object of the invention is to provide a simple and rigid form of mounting for the transmission apparatus.

The means by which these and other objects of the invention are attained may best be understood from a detailed description of a practical transmission apparatus embodying the invention and illustrated in the accompanying drawings, in which:—

Fig. 1 is an axial section of the apparatus; and

Figure 2 is a transverse section upon the line 2—2 of Figure 1.

The transmission apparatus illustrated has a framework consisting of an approximately cylindrical casing 10, secured to a base 11, which holds it with its axis horizontal. The casing is formed of two cup-shaped members 12, 13, whose edges are secured together by means of bolts $A^3$. In the center of one of the end walls of the casing is a bearing 14 for the driven shaft 15 of the transmission, while in the opposite wall is an aligned bearing 16 for the driving shaft 17.

The mechanism of the transmission includes a fixed outer gear A formed by the edge portions of the cup-shaped members 12, 13, and an inner gear B mounted for revolutionary movement on a supporting member or cage $B^2$ consisting of two disks $B^3$, $B^4$, secured together by bolts $B^5$ passing through large openings $B^6$ in the gear B. The disc $B^3$ is keyed to the driven shaft 15, while the disc $B^4$ is rotatably mounted on the driving shaft 17. The gear B is connected with its supporting cage $B^2$ by three cranks or pairs of links $B^8$, each secured at one end to the gear B by pivots or crank pins $B^9$, and at the other end to the cage $B^2$ by pivots or stub shafts $B^{10}$. This connection constrains the gear B against rotational movement on its axis with respect to the cage $B^2$, but permits the gear B to have a bodily revolutionary movement about the axis of the cage $B^2$.

The inner and outer gears A, B are arranged for combined positive and frictional engagement. The outer gear A has a cylindrical friction surface $A^1$ formed on flanges $A^2$ at the edges of the cups 12, 13. The diameter of this cylindrical surface is the pitch diameter of the outer gear. The bolts $A^3$, by which the cups 12, 13 are secured together, serve to space the edges of the cups apart so as to leave an open space or recess $A^4$ between the edges of the flanges $A^2$ on which the friction surface $A^1$ is formed. These bolts $A^3$ have their axes in the cylindrical surface $A^1$, so that one-half of each bolt projects out from the surface $A^1$, as shown in Fig. 2.

The inner gear is provided with a cylindrical friction surface $B^1$ adapted to engage the friction surface $A^1$. The diameter of this cylindrical surface is the pitch diameter of the inner gear. In the middle of the friction surface $B^1$ is a circumferential projection or rib $B^{11}$ which projects into the space $A^4$ between the flanges $A^2$. The friction surface $B^1$ and the rib $B^{11}$ are cut by transverse grooves $B^7$ which are separated by the same distance as the bolts $A^3$, so that they serve to embrace the bolts and form a positive driving connection between the two gears.

The weight and centrifugal force of the inner gear B are counterbalanced by weights $B^{12}$ formed at the outer ends of the cranks or links $B^8$. The combined mass of the weights $B^{12}$ is equal to that of the links and the inner gear. In order that the centrifugal force of the inner gear may be utilized to force its friction surface $B^1$ against the friction surface $A^1$ of the outer gear, the apparatus is arranged so that the counterbalancing centrifugal force of the weights $B^{12}$ is not applied directly to the inner gear B, but is applied to the driving and driven shafts through the cage $B^2$. This result is obtained by making the sum of the throw of the cranks $B^8$ and the pitch radius of the inner gear B a little greater than the pitch radius of the outer gear (the amount of the difference being too small to be shown in the drawings), and also, most desirably, by providing a yielding connection between the inner gear and the weights $B^{12}$. This may be done by providing resilient roller bearings $B^{13}$ between the pivots or crank pins $B^9$ and the inner gear B (as shown in the drawings) or between the pivots $B^9$ and the links $B^8$.

The required revolutionary movement is given to the inner gear by means of a crank 18 on the inner end of the driving shaft 17. In order to permit the inner gear to move outwardly under the effect of centrifugal force, a resilient roller bearing 19 is provided between the pin 20 of the crank 18 and the inner gear B, and a similar resilient bearing 21 may be provided for the driving shaft 17 itself.

In the operation of the device, power is applied to the driving shaft 17 to revolve the inner gear B. As the outer gear A is fixed, being formed on the frame-work of the mechanism, the engagement of the two gears results in giving the cage $B^2$ and the driven shaft 15 rotation at a reduced speed and in the opposite direction from that of the driving shaft 17. The reduction in speed is in the ratio of the difference between the diameters of the two gears to the diameter of the inner gear. It may accordingly be made very large by making the two gears of nearly the same diameter.

A positive driving connection between the two gears is secured by the engagement of the notches $B^7$ with the bolts $A^3$, so that no slip can occur, even when the driving shaft is revolving so slowly that there is little or no pressure between the friction surfaces of the gears. When, however, the driving shaft is rotated at high speed, the inner gear B is forcibly thrown outward by centrifugal force, bringing its friction surface $B^1$ in firm contact with the friction surface $A^1$ of the outer gear. The contact between these surfaces relieves the bolts and grooves $A^3$, $B^7$ of all radial load and also relieves them of all, or a large part of, the torque load as soon as the friction surfaces become firmly held together by centrifugal force.

The weights $B^{12}$ counterbalance the centrifugal force of the inner gear about the axis of the driving and driven shafts, so that the transmission as a whole is balanced. These weights, however, in no way restrain outward movement of the inner gear under its own centrifugal force.

The mounting of the apparatus shown is simple, strong and rigid and is extremely satisfactory when a high reduction is desired. It will be understood, however, that other features of the invention, such as the construction of the engaging surfaces of the two gears, may be applied to a transmission apparatus which is mounted so that the outer gear revolves while the cage is held stationary, or a transmission in which either the outer gear or the cage may be locked stationary while the other is locked to the driving shaft.

What I claim is:

1. In transmission apparatus, cooperating inner and outer gears, and means for revolving the inner gear about an axis of the outer gear, and weights arranged to counterbalance the centrifugal force of the inner gear about the axis of the outer gear, the inner gear being mounted to move outwardly under the effect of its centrifugal force.

2. In transmission apparatus, the combination with an outer gear, an inner gear, the inner gear being mounted for a bodily revolutionary movement thereof, of weights counterbalancing the weight of the inner gear, and yielding connections between said weights and the inner gear.

3. In transmission apparatus, the combination with an outer gear, an inner gear, a supporting member therefor, and a plurality of parallel links connecting the inner gear to the supporting member so as to permit bodily revolution of the gear about the axis of the supporting member, of resilient elements permitting an increase in the effective length of said links, and weights on said links counterbalancing the weight of said gear.

4. Transmission apparatus, comprising a fixed casing, an outer gear fixed in said casing, aligned driving and driven shafts journaled in the ends of said casing, a single inner gear cooperating with said outer gear and having its center eccentrically mounted on said driving shaft, means within the casing for transferring rotational movements of the inner gear to the driven shaft, said inner gear being mounted to move outwardly under the effect of its centrifugal force, and means counterbalancing the centrifugal effect of said inner gear on said transferring means.

5. Transmission apparatus, comprising a fixed substantially cylindrical casing whose inner wall provides a gear surface, aligned driving and driven shafts journaled in the ends of said casing, an inner gear cooperating with the gear surface provided by the casing and having its center eccentrically mounted on the driving shaft, and means within the casing for transferring rotational movements of the inner gear to the driven shaft, said means including a support fixed to the driven shaft, links between said support and said inner gear, and weights on said links arranged to counter-balance the centrifugal force of said inner gear, said inner gear being mounted to move outwardly under the effect of its centrifugal force.

6. In transmission apparatus, two cup-shaped members, bolts connecting said members and holding their edges in spaced relation, aligned driving and driven shafts journaled in the ends of said cup-shaped members, an inner gear having its center eccentrically mounted on said driving shaft and having at its periphery transverse recesses adapted to engage said bolts, and means for transferring rotational movements of the inner gear to the driven shaft.

7. Transmission apparatus, comprising two cup-shaped members secured together at their peripheries to form a cylindrical casing, and an outer gear extending around the inner wall of said casing, aligned driving and driven shafts journaled in opposite side walls of said casing, a cage journaled on said driving shaft and keyed to the driven shaft, an inner gear cooperating with the outer gear and mounted within said cage for revolutionary movement, and a crank on the driving shaft connected with the inner gear, said inner gear being mounted to move outwardly under the effect of its centrifugal force.

8. Transmission apparatus comprising co-operating inner and outer gears having cooperating friction surfaces at their pitch circles, of which one is provided with spaced transverse ridges while the other is provided with correspondingly spaced transverse grooves, means for revolving the inner gear about the axis of the outer gear, and weights arranged to counterbalance the centrifugal force of the inner gear about the axis of the outer gear, said inner gear being mounted to move outwardly under the effect of its centrifugal force so as to bring its friction surface into firm contact with the friction surface of the outer gear thus reducing the strain on said transverse ridges.

9. A transmission apparatus comprising a casing, an outer gear fixed in said casing, aligned driving and driven shafts journalled in the ends of said casing, an inner gear cooperating with said outer gear and having its center eccentrically mounted on said driving shaft, a cage journalled on one of said shafts and keyed to the other one, links connecting said cage to said inner gear and having weights counterbalancing the centrifugal effect of said inner gear and resilient elements between said inner gear and said cage and between said inner gear and said driving shafts permitting the inner gear to move outwardly under the effect of its centrifugal force.

In testimony whereof I have hereunto set my hand.

JOHN J. O. RULIANCICH.